United States Patent
Ferguson et al.

(10) Patent No.: US 7,227,840 B1
(45) Date of Patent: Jun. 5, 2007

(54) HIGH PERFORMANCE PROBABILISTIC RATE POLICER

(75) Inventors: Dennis C. Ferguson, Palo Alto, CA (US); Devereaux C. Chen, Cupertino, CA (US); John W. Stewart, III, San Francisco, CA (US); James Washburn, Palo Alto, CA (US); Jeffrey R. Zimmer, Scotts Valley, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1103 days.

(21) Appl. No.: 10/098,493

(22) Filed: Mar. 18, 2002

(51) Int. Cl.
*H04L 12/22* (2006.01)
*H04L 12/56* (2006.01)

(52) U.S. Cl. .................. 370/230; 370/389; 370/391; 370/392

(58) Field of Classification Search ............... 370/230, 370/233, 235–238, 389, 391, 392
See application file for complete search history.

(56) References Cited

U.S. PATENT DOCUMENTS

| 6,901,052 B2 * | 5/2005 | Buskirk et al. | 370/235 |
| 6,944,168 B2 * | 9/2005 | Paatela et al. | 370/401 |
| 6,996,117 B2 * | 2/2006 | Lee et al. | 370/429 |
| 2002/0163909 A1 * | 11/2002 | Sarkinen et al. | 370/386 |

* cited by examiner

*Primary Examiner*—Wing Chan
*Assistant Examiner*—Venkatesh Haliyur
(74) *Attorney, Agent, or Firm*—Harrity Snyder LLP

(57) ABSTRACT

A data flow rate policer enforces data flow policies for a number of data flows using a probabilistic policy enforcement mechanism. The policer includes a memory that stores the state of each data flow in a compact data structure. Additionally, the policer includes one or more policing engines that implement the actual data flow policies based on information derived from the data structures. The policing engines may be implemented in hardware to increase performance.

21 Claims, 10 Drawing Sheets

HIGH PERFORMANCE PROBABILISTIC RATE POLICER

BACKGROUND OF THE INVENTION

A. Field of the Invention

The present invention relates generally to data switching and routing, and more particularly, to systems and methods for controlling data flow.

B. Description of Related Art

Routers receive data on physical media, such as optical fiber, analyze the data to determine its destination, and output the data on physical media in accordance with the destination. Routers were initially designed using a general purpose processor executing large software programs. As line rates and traffic volume increased, however, general purpose processors could not scale to meet these new demands. For example, as functionality was added to the software, such as accounting and policing functionality, these routers suffered performance degradation. In some instances, the routers failed to handle traffic at line rate when the new functionality was turned on.

To meet the new demands, purpose-built routers were architected. Purpose-built routers are designed and built with components optimized for routing. They not only handled higher line rates and higher network traffic volume, they also added functionality without compromising line rate performance.

Flow-control refers to the metering of packet flow through the network and/or through the router. For example, it may be desirable to limit the number of packets received from a certain port of the router to a pre-designated rate. One known method of implementing flow-control is based on a credit system. With this method, each data flow that is to be controlled is associated with a credit counter. As packets in the flow are transmitted by the router, the credit counter is decremented. Conversely, the credit counter is incremented based on a credit replenishment scheme, such as by periodically incrementing the credit counter up to a maximum credit amount. The router checks the credit counter before transmitting a packet and drops the packet if the credit counter is below a predetermined value. Through the operation of this type of credit-counter, the router can enforce a data flow policy such as limiting the maximum transmission rate for a particular data flow below a certain rate.

FIG. 1 is a diagram illustrating an exemplary situation in which flow control may be used to enforce data flow policies. As is generally shown in FIG. 1, an Internet Service Provider (ISP) 104 may provide network services to a number of customers. A customer may be, for example, a corporation or an individual. Each customer is associated with a customer router/switch 101–103. Routers/switches 101–103 connect the users associated with a customer, such as users 110, to ISP 104. ISP 104, in turn, connects the customers to network 105 (e.g., the Internet). Routers 120 of ISP 104 handle the actual routing of packet data between network 105 and the customer routers/switches 101–103.

ISP 104 may wish to give each customer a predetermined guaranteed bandwidth. The total bandwidth of the data flow coming from each customer should not exceed this bandwidth. If it does, ISP 104 may drop packets from the customer's data flow. Traditional credit-based flow control techniques, such as those discussed above, may be used by ISP 104 to manage the bandwidth being used by the ISP's customers.

One drawback of traditional credit-based flow control techniques is that these techniques tend to produce "choppy" traffic patterns when interacting with other network protocols, such as the commonly used Transmission Control Protocol (TCP). FIG. 2 is a diagram illustrating a typical choppy traffic pattern that occurs through the interaction of TCP with traditional credit-based traffic flow techniques. Line 201 represents the predetermined maximum bandwidth available to the customer. Line 202 represents the instantaneous bandwidth of a packet flow. Above line 201, conventional credit-based flow control techniques drop all packets. The sudden increase in dropped packets may cause network devices that implement TCP earlier in the data flow path to respond by scaling back the rate of transmitted packets, causing the transmitted bandwidth to suddenly decrease. This pattern of over-transmission followed by over-reduction in the bandwidth of the data flow forms the choppy data flow pattern shown by line 202. This type of pattern flow makes inefficient use of the allotted bandwidth.

Accordingly, there is a need in the art to improve traditional flow control techniques.

SUMMARY OF THE INVENTION

Systems and methods consistent with the principles of the invention, among other things, provide for improved data flow policy enforcement mechanisms.

One aspect consistent with the principles of the invention is directed to a data flow policing device. The device includes a policer and a memory. The policer is configured to receive a policing request that includes an indication of a packet belonging to a data flow. The policer determines whether the packet is within specification using a function that implements a probabilistic comparison based on a credit count associated with the data flow. The memory stores a data structure corresponding to the data flow. The data structure includes the credit count of the data flow.

Another aspect consistent with the principles of the invention is directed to a data flow policing device that includes a memory configured to store data structures corresponding to a plurality of data flows and a policer. The data structures include at least a credit count associated with the data flows. The policer receives a policing request that includes an indication of a packet belonging to at least one of the data flows. The policer, in response to the request, reads the data structure corresponding to the data flow from the memory, determines whether the packet is within specification based on the credit count associated with the data flow, and writes an updated version of the read data structure to the memory.

Yet another aspect consistent with the invention is directed to a method that includes receiving a request to perform a credit based flow control operation. The request identifies at least the length of a data packet and a flow to which the data packet belongs. The method also includes reading a data structure corresponding to the identified flow from a memory, where the data structure includes at least an indication of a credit count associated with the data flow. Further, the method includes determining whether the data packet is within specification based on the credit count and the packet length and updates the data structure in the memory.

A further aspect consistent with the invention is a network device comprising a physical interface configured to receive packets from and transmit packets to a network and a processing unit. The processing unit is configured to store the received packets and examine header information of the packets to determine a destination device for the packets. The processing unit includes a route lookup unit that comprises a plurality of route lookup engines, a policer, and a memory. The policer receives a policing request for a packet associated with a data flow from one of the route lookup engines and determines whether the packet is within specification based on information contained in the data structure associated with the data flow. The memory is coupled to the policer and stores the data structure corresponding to the data flow.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents of the claim limitations.

As described herein, a rate policer enforces data flow policies for a number of data flows using a probabilistic policy enforcement mechanism. The state of each data flow is stored in a compact data structure, allowing the number of data flows handled by the policer to be programmably increased or decreased. The computations performed by the rate policer can be implemented in hardware to increase performance.

System Configuration

Figure 3:
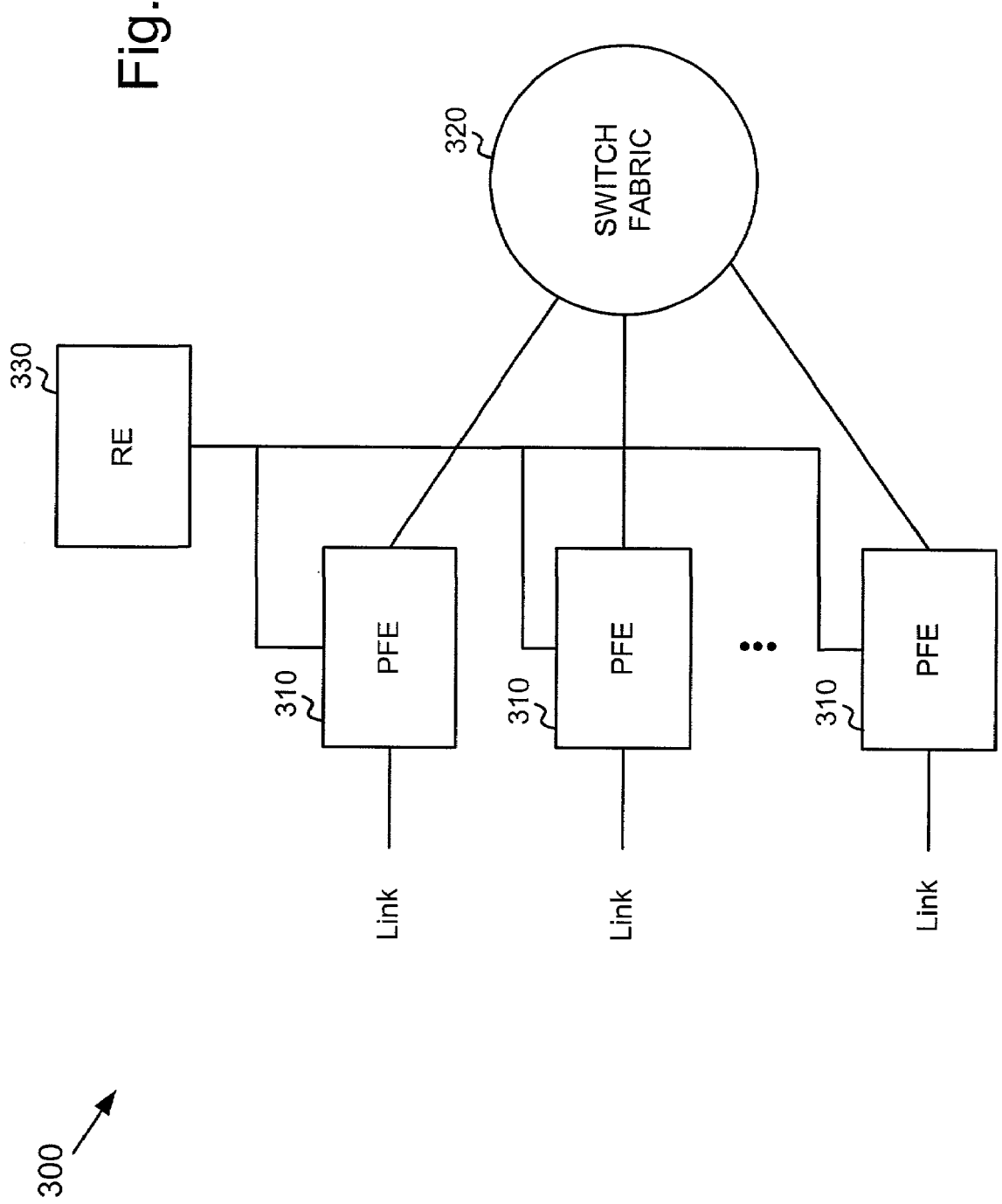
FIG. 3 is a block diagram illustrating an exemplary routing system.

FIG. 3 is a block diagram illustrating an exemplary routing system 300 in which systems and methods consistent with the principles of the invention may be implemented. System 300 receives data from a physical link, processes the data to determine destination information, and transmits the data out on a link in accordance with the destination information. System 300 may include packet forwarding engines (PFEs) 310, a switch fabric 320, and a routing engine (RE) 330.

RE 330 performs high level management functions for system 300. For example, RE 330 may communicate with other networks and systems connected to system 300 to exchange information regarding network topology. RE 330 may create routing tables based on network topology information, create forwarding tables based on the routing tables, and forward the forwarding tables to PFEs 310. PFEs 310 may use the forwarding tables to perform route lookup for incoming packets. RE 330 may also performs other general control and monitoring functions for system 300.

PFEs 310 are each connected to RE 330 and switch fabric 320. PFEs 310 receive data at ports on links connected to a device or a network, such as a wide area network (WAN) or a local area network (LAN). Each link could be one of many types of transport media, such as optical fiber, Ethernet cable, or wireless. The data on the link is formatted according to one of several protocols, such as the synchronous optical network (SONET) standard or Ethernet.

PFE 310 processes incoming data by stripping off the data link layer. PFE 310 may convert header information from the remaining data into data structures referred to herein as "cells" (where a cell is a fixed length data unit). For example, in one embodiment, the data remaining after the data link layer is stripped off is packet data. PFE 310 includes the layer 2 (L2) and layer 3 (L3) packet header information, some control information regarding the packets, and the packet data in a series of cells called "D" cells. In one embodiment, the L2, L3, and the control information are stored in the first two cells of the series of cells.

PFE 310 may form a notification based on the L2, L3, and control information, and performs a route lookup using the notification and the routing table from RE 330 to determine destination information. PFE 310 may also further process the notification to perform protocol-specific functions, policing, and accounting, and might even modify the notification to form a new notification. One policing function that may be performed by PFE 310 is flow control, such as credit based flow control, as will be described below.

If the determined destination indicates that the packet should be sent out on a link connected to PFE 310, then PFE 310 retrieves the cells for the packet, converts the notification or new notification into header information, forms a packet using the packet data from the cells and the header information, and transmits the packet from the port associated with the link.

If the destination indicates that the packet should be sent to another PFE via switch fabric 320, then PFE 310 retrieves the cells for the packet, modifies the first two cells with the new notification and new control information, if necessary, and sends the cells to the other PFE via switch fabric 320. Before transmitting the cells over switch fabric 320, PFE 310 may append a sequence number to each cell, which allows the receiving PFE to reconstruct the order of the transmitted cells. Additionally, the receiving PFE uses the notification to form a packet using the packet data from the cells, and sends the packet out on the port associated with the appropriate physical link of the receiving PFE.

In summary, in one embodiment, RE 330, PFEs 310, and switch fabric 320 perform routing based on packet-level processing. PFEs 310 store each packet in cells while performing a route lookup using a notification, which is based on packet header information, including L2 and L3 layer header information. A packet might be received on one PFE and go back out to the network on the same PFE, or be sent through switch fabric 320 to be sent out to the network on a different PFE.

Figure 4:
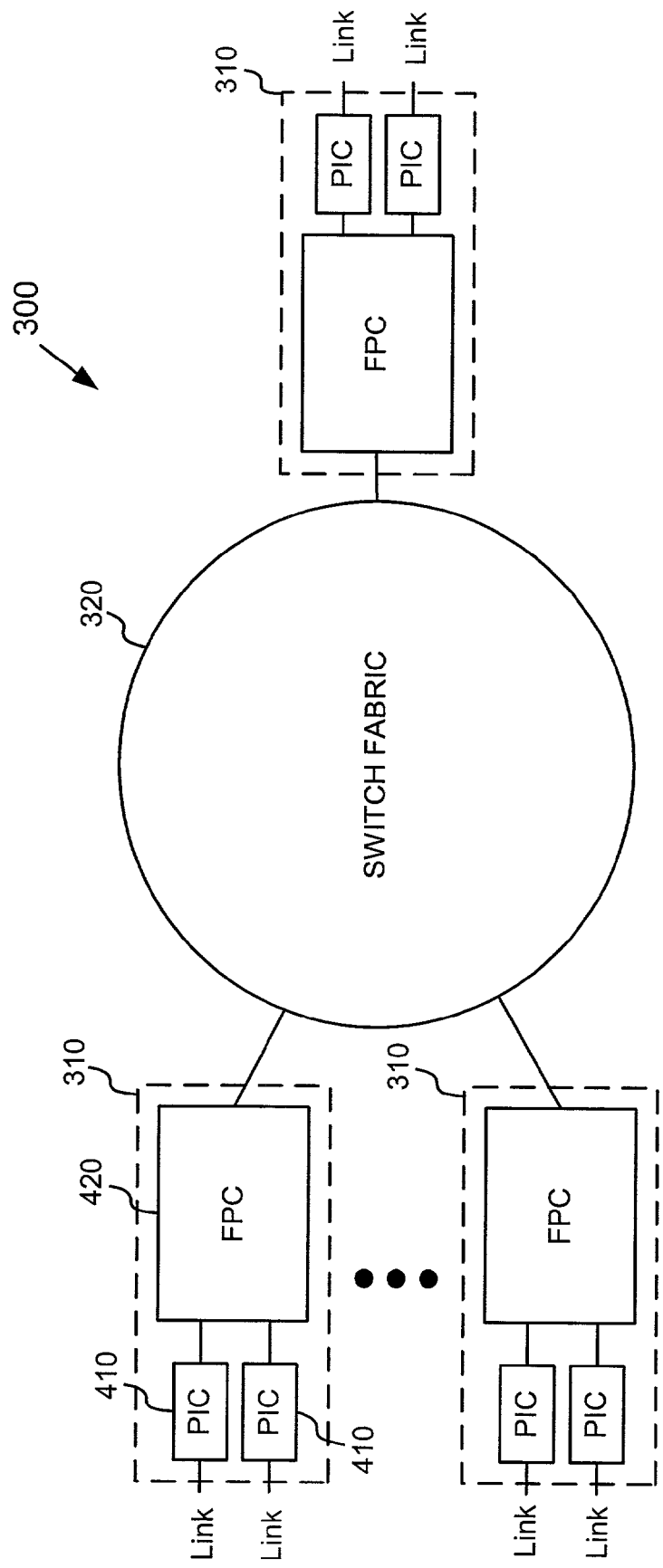
FIG. 4 is an exemplary detailed block diagram illustrating portions of the routing system shown in FIG. 3.

FIG. 4 is an exemplary detailed block diagram illustrating portions of routing system 300. PFEs 310 connect to one another through switch fabric 320. Each of the PFEs may include one or more physical interface cards (PICs) 410 and flexible port concentrators (FPCs) 420.

PIC 410 may transmit data between a link and FPC 420. Different PICs may be designed to handle different types of links. For example, one of PICs 410 may be an interface for an optical link, another PIC may be an interface for an Ethernet link, and another a wireless interface.

FPCs 420 perform routing functions and handle packet transfers to and from PICs 410 and switch fabric 320. For each packet it handles, FPC 420 performs the previously-discussed route lookup function. Although FIG. 4 shows two PICs 410 connected to each of FPCs 420 and three FPCs 420 connected to switch fabric 320, in other embodiments consistent with principles of the invention there can be more or fewer PICs 410 and FPCs 420.

Figure 5:
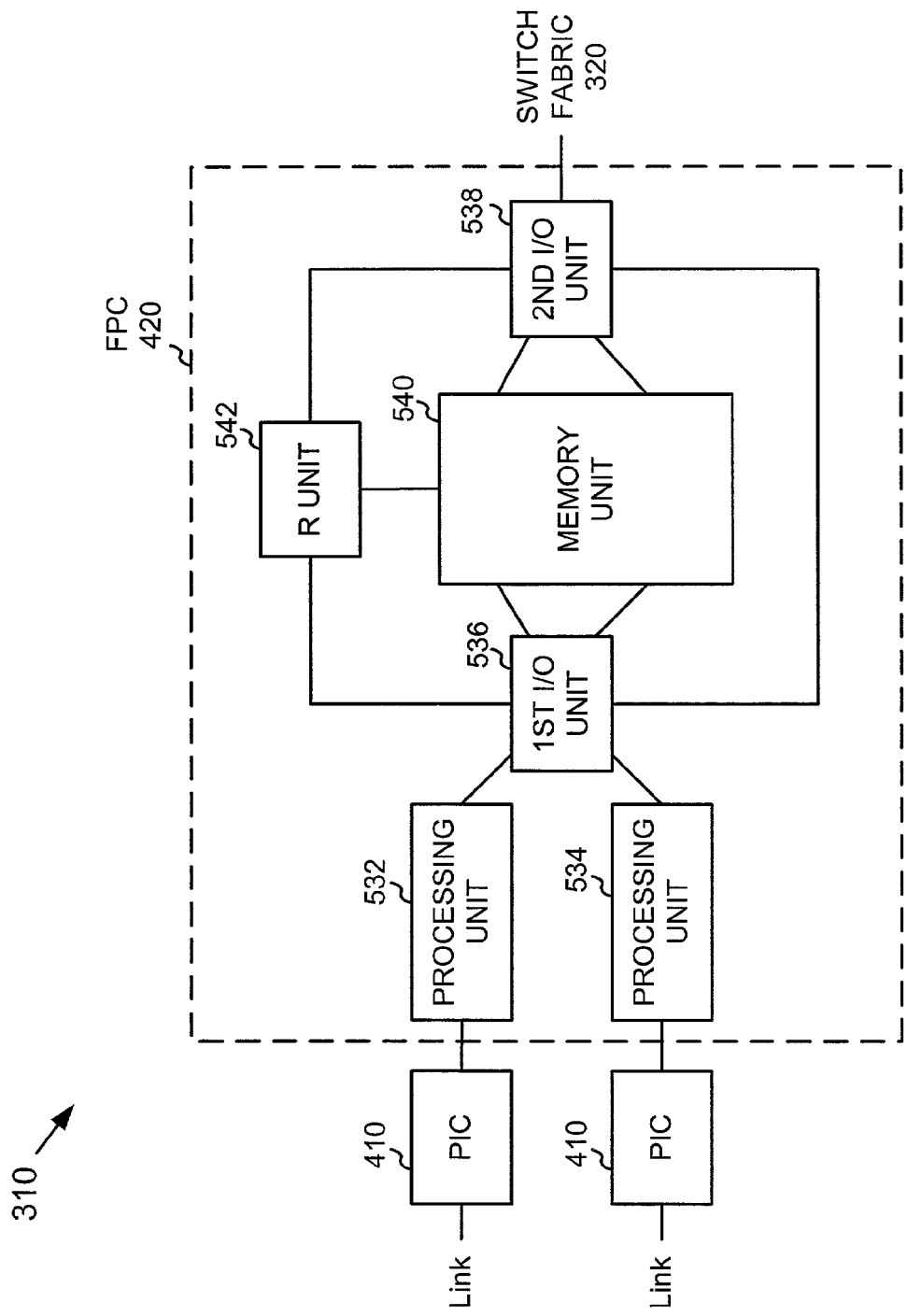
FIG. 5 is an exemplary configuration of a flexible port concentrator according to an implementation consistent with the principles of the invention.

FIG. 5 is an exemplary configuration of FPC 420 according to an implementation consistent with the principles of the invention. FPC 420 may include processing units 532 and 534, first input/output (I/O) unit 536, second I/O unit 538, memory unit 540, and R unit 542. Although FIG. 5 illustrates each processing unit 532 and 534 corresponding to one of PICs 410, other embodiments consistent with the principles of the invention may have additional PICs 410 attached to each processing unit 532 and 534.

As will be described in greater detail below, processing units 532 and 534 may process packet data flowing between PICs 410 and first I/O unit 536. Each processing unit 532 and 534 may operate to process packet data received from the PIC(s) connected to it and to process data received from first I/O unit 536.

More particularly, processing unit 532 or 534 may process packets from PIC 410 to convert the packets into data cells, and transmit the data cells to first I/O unit 536. Data cells are the data structure used by FPC 420 internally for transporting and storing data. In one implementation, data cells are 64 bytes in length.

In the other direction, processing unit 532 or 534 receives data cells from first I/O unit 536, extracts certain information and packet data from the data cells, and creates a packet based on the extracted information. Processing unit 532 or 534 creates the packet header from the information extracted from the data cells. In one embodiment, processing unit 532 or 534 creates L2 and L3 header information based on the extracted information. The created L2 and L3 header information constitutes a new header that the packet uses as it is subsequently transmitted through the link.

Memory unit 540 may temporarily store data cells from first I/O unit 536 and second I/O unit 538 and notifications from R unit 542. Memory unit 540 may dispatch the notifications to first I/O unit 536 and second I/O unit 538. In response, first I/O unit 536 and second I/O unit 538 may use the address information in the notification to read out data cells from memory unit 540 that correspond to a notification. The notification received from memory unit 540 may have been modified by R unit 542 with route or encapsulation lookup results. First I/O unit 536 and second I/O unit 538 may update the data cells read out of memory unit 540 with information from the modified notification. The data cells, which now include information from the modified notification, are sent to processing unit 532, processing unit 534, or switch fabric 320, depending on which of first I/O unit 536 or second I/O unit 538 is processing the notification.

Figure 1:
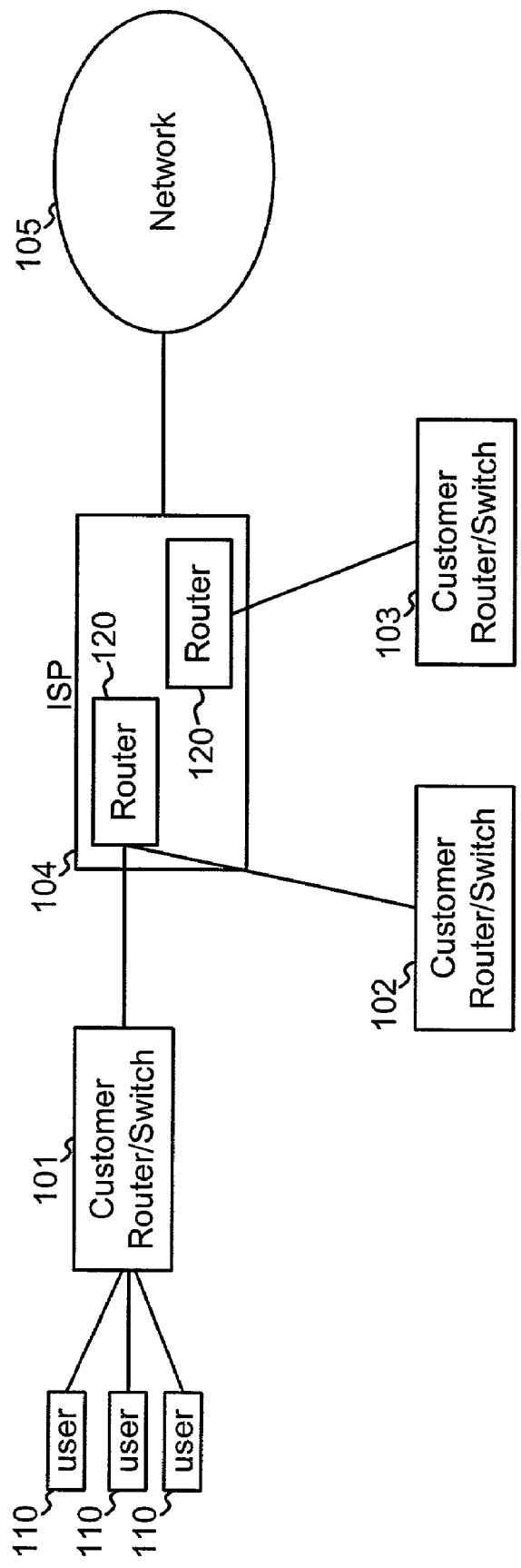
FIG. 1 is a diagram illustrating an exemplary situation in which flow control may be used to enforce data flow policies.
Figure 2:
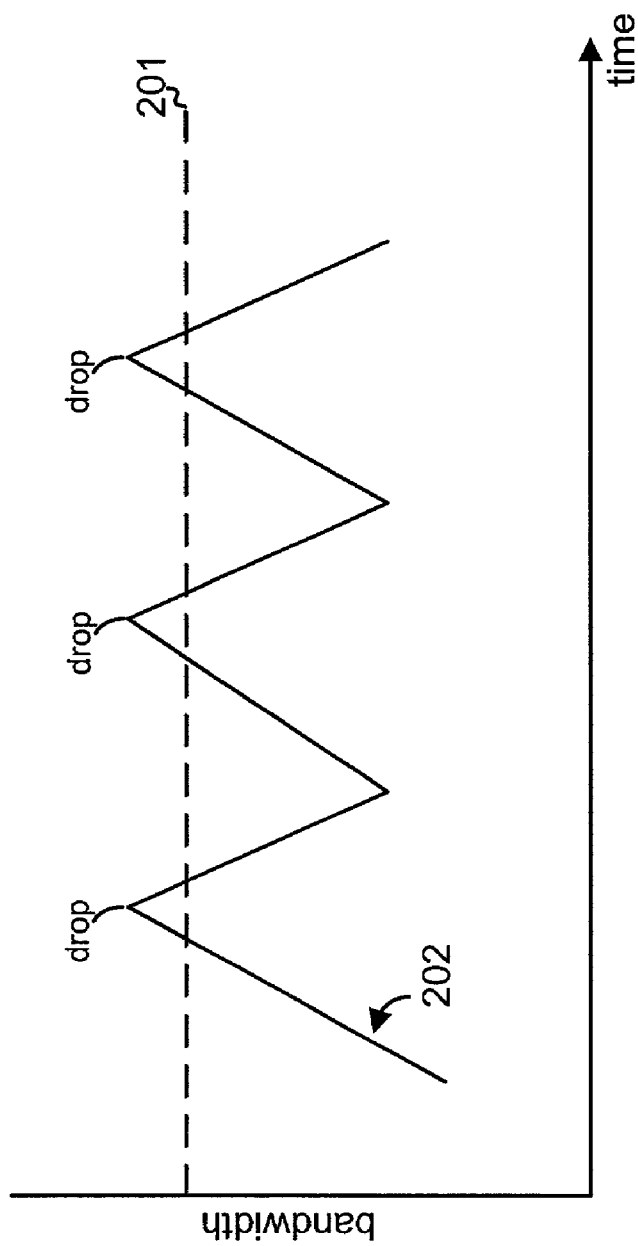
FIG. 2 is a diagram illustrating a typical choppy traffic pattern that occurs through the interaction of TCP with traditional credit-based traffic flow techniques.

R unit 542 may receive notifications from first I/O unit 536 and second I/O unit 538. R unit 542 may receive one or more forwarding tables from RE 330 (FIG. 1), and use the forwarding tables and encapsulation tables to perform route or encapsulation lookups. R unit 542 may insert the lookup result into a notification, which it may store in memory unit 540.

R unit 542 may provide route lookup, accounting, and policing functionality based on the notifications. Consistent with aspects of the invention, the policing function performed by R unit 542 includes probabilistic packet flow policing. This aspect of the invention will be described in more detail below.

Probabilistic Flow Policing

Figure 6:
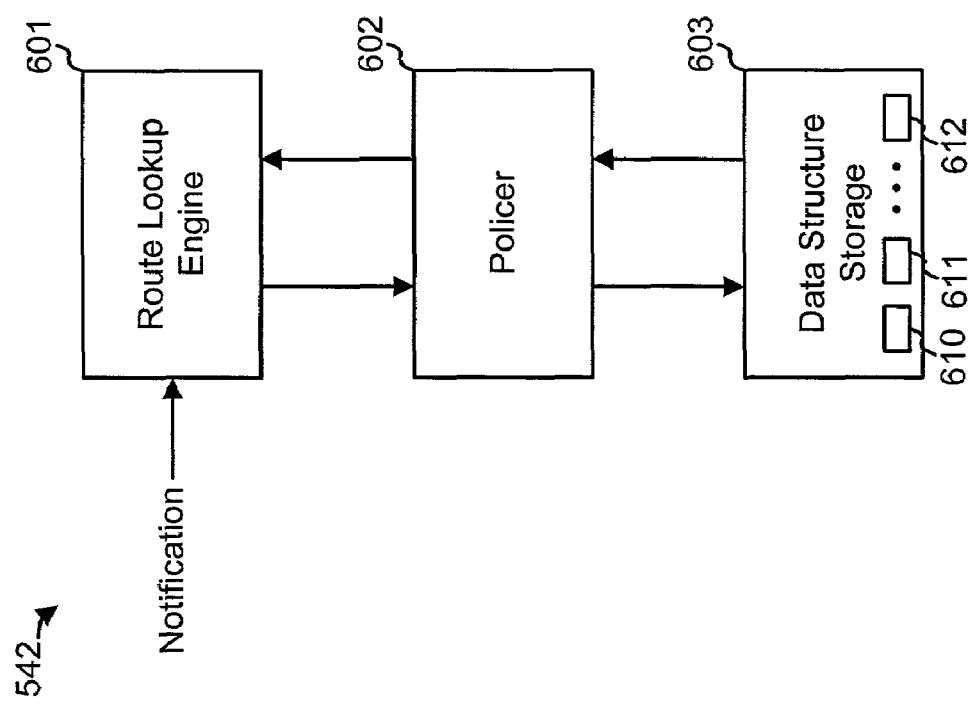
FIG. 6 is a diagram illustrating portions of the routing system shown in FIG. 3 that relate to data flow policing.

FIG. 6 is a diagram illustrating portions of R unit 542 as they relate to policing functionality implemented by routing system 300. R unit 542 may include one or more route lookup engines 601 that receive the notifications from first and second I/O units 536 and 538. For simplicity, only a single route lookup engine is shown, although in practice multiple parallel route lookup engines 601 may be used. The route lookup engine 601 uses the forwarding tables from RE 330 to perform route lookups for the packets corresponding to the incoming notifications. Each notification may include an indication of the data flow corresponding to the packet and whether that data flow is subject to policing. Based on this information in the notification, route lookup engine 601 determines whether to generate a request to policer 602.

In another embodiment consistent with the principles of the invention, route lookup engine 601, independently of the notifications, keeps track of which data flows are subject to policing. Based on this information, router lookup engines determines whether to generate requests to policer 602.

Policer 602 receives policing requests from route lookup engine 601. In response, policer 602 determines whether the packet corresponding to the request is within its credit limit specification. If it is, route lookup engine 601 forwards the packet as normal. If it is not, route lookup engine 601 may drop the packet. Alternatively, instead of simply dropping the packet, route lookup engine 601 may perform some other function on the packet, such as tagging the packet for special handling. A packet corresponding to an acceptable credit count will be referred to herein as a packet that is "within specification" while packets that are to be dropped or tagged will be referred to as "out of specification" packets.

Data structure storage component 603 stores data structures, such as data structures 610–612, which are used by policer 602. In one implementation consistent with aspects of the invention, data structure storage component 603 is a high-speed random access memory that stores a data structure corresponding to each data flow on which policer 602 may operate. The data structures store information, such as the present credit count corresponding to the data flow.

Figure 7:
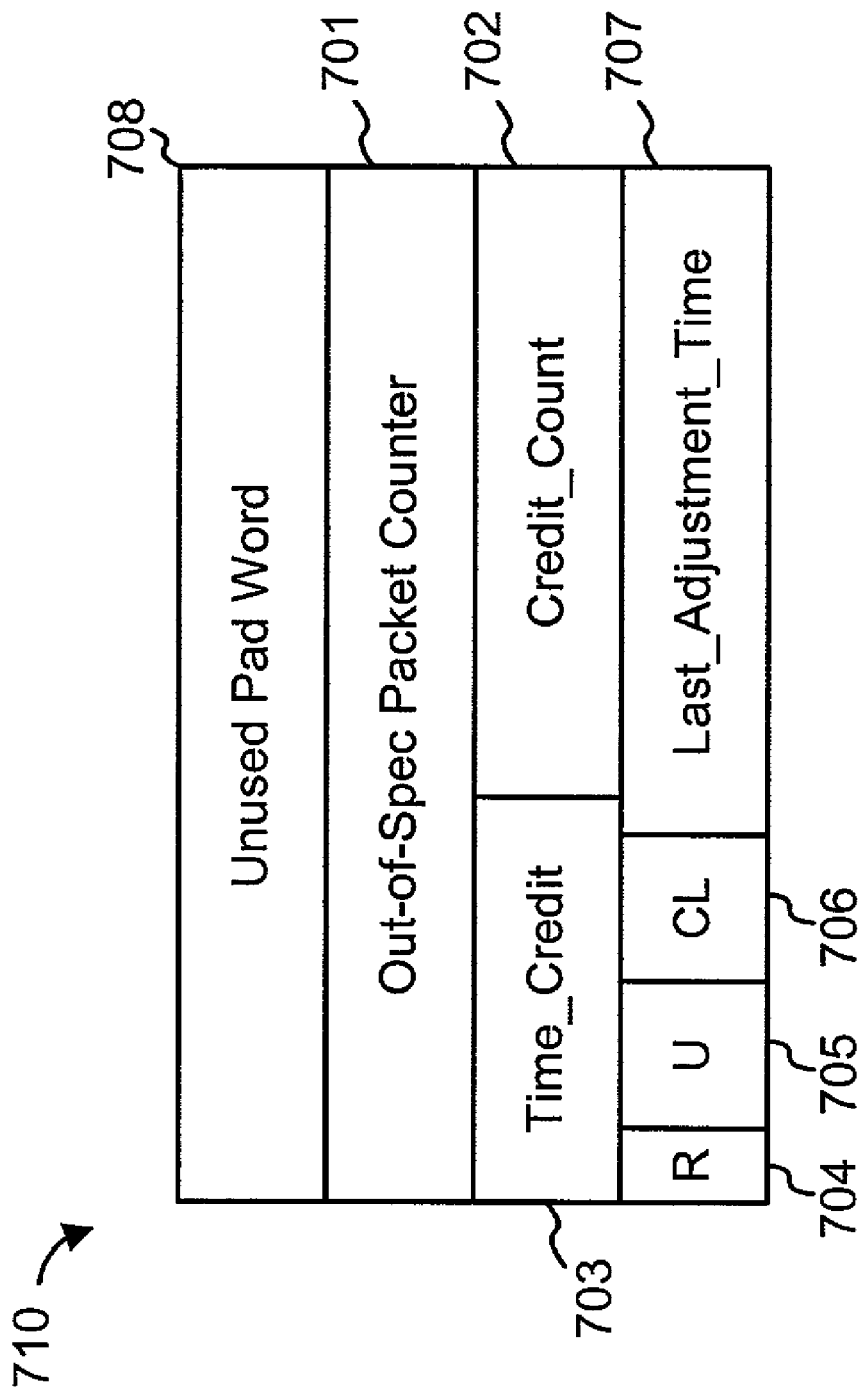
FIG. 7 illustrates a data structure used to store state information for a data flow.

FIG. 7 is a diagram illustrating an exemplary implementation of one of the data structures 610–612, illustrated as data structure 710. As shown, data structure 710 includes out-of-spec packet counter field 701, credit_count field 702, time_credit field 703, R field 704, U field 705, CL field 706, and last_adjustment_time field 707. An unused pad field 708 may also be included. Policer 602 uses out-of-spec packet counter field 701 to keep track of the number of packets that it determines to be out of specification. Time_credit field 703 stores a value that represents the amount of credit to allot per unit of time. Credit_count field 702 stores the current count and last_adjust_time field 707 indicates the previous time that the credit counter was increased.

R field 704 stores a value that determines the granularity of the time value kept by policer 602 when determining current_time. For example, based on R field 704, the time value kept by policer 602 may have a period of 5.6 microseconds (1/1024 of the core clock period), 210 micro-seconds (1/32 of the core clock period), 6712 micro-seconds (the core clock period), or 215092 micro-seconds (32 times the core clock period). U field 705 stores a value that represents the granularity with which the actual packet length (PLEN) is used in calculating the new credit value. In one implementation, PLEN is multiplied by 2 raised to the value stored in U field 705 to obtain an adjusted packet length that is then subtracted from credit_count. Thus, when U field 705 stores the value zero, the adjusted packet length is equal to the actual packet length. CL field 1006 stores the value of credit_limit.

In one exemplary implementation, data structure 710 may be a 128 bit structure divided into four 32 bit words. More specifically, unused pad field 708 and out-of-spec packet counter field 702 may be 32 bit fields, current credit field 702 may be a 19 bit field, and time credit field 703 may be a 13 bit field. R field 704, U field 705, CL field 706, and last adjustment time field 707 may be, respectively, two bit, four bit, four bit, and 22 bit fields.

Time_credit field 703, R field 704, U field 705, and CL field 706 are user programmable values that are generally held constant throughout the operation of system 300. In contrast, out-of-spec packet counter 701, credit_count field 702, and last_adjustment_time field 707 may be dynamically adjusted by policer 602 when it processes the data structure's corresponding packet.

Figure 8:
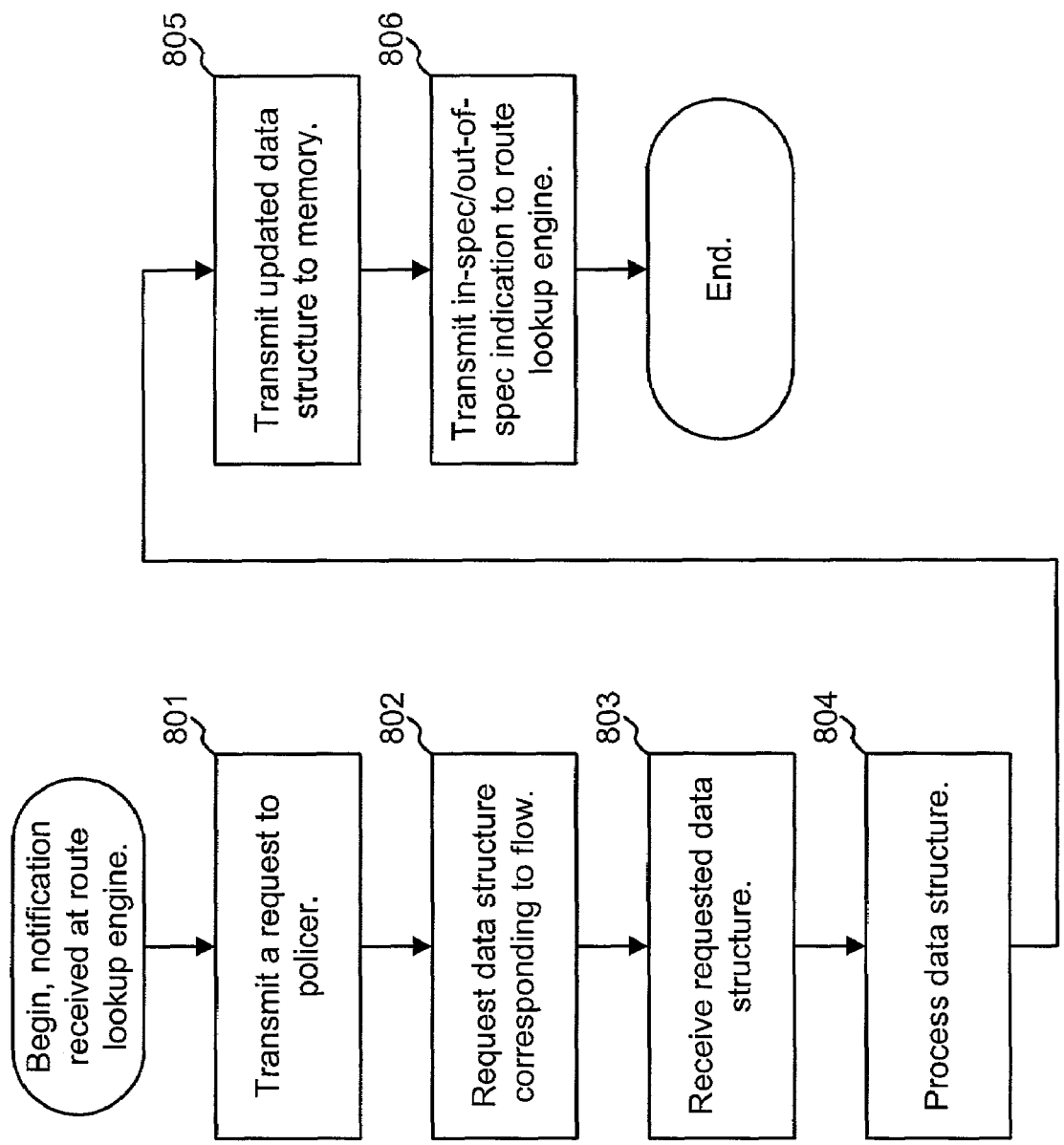
FIG. 8 is a flow chart illustrating exemplary operation of the components illustrated in FIG. 6.

FIG. 8 is a flow chart illustrating exemplary operation of route lookup engine 601, policer 602, and data structure storage component 603. As previously mentioned, route lookup engine 601 decides whether to perform credit-based flow control on a received packet based on an indication in the notification corresponding to the packet. In this manner, system 300 can be configured to perform flow control only on certain packet flows. When performing flow control, route lookup engine 601 begins by transmitting a request to policer 602 (Act 801). The request may include an indication of the packet's length and an identification of the data flow to which the packet belongs.

In response to the request, policer 602 accesses data structure storage component 603 and requests the data structure corresponding to the data flow (Act 802). Policer 602 receives the corresponding data structure from data structure storage component 603 (Act 803). As described above, the fields in the data structure include a current credit field (credit_count) that stores the current number of credits associated with the flow and a credit limit field (CL) that specifies the maximum allowed value of the current credit field.

With the data structure corresponding to the active data flow in hand, policer 602 processes the data structure (Act 804). Policer 602 then returns an updated version of the data structure to data structure storage component 603 and transmits an indication of whether the packet is within specification or out of specification to route lookup engine 601 (Acts 805 and 806).

Figure 9:
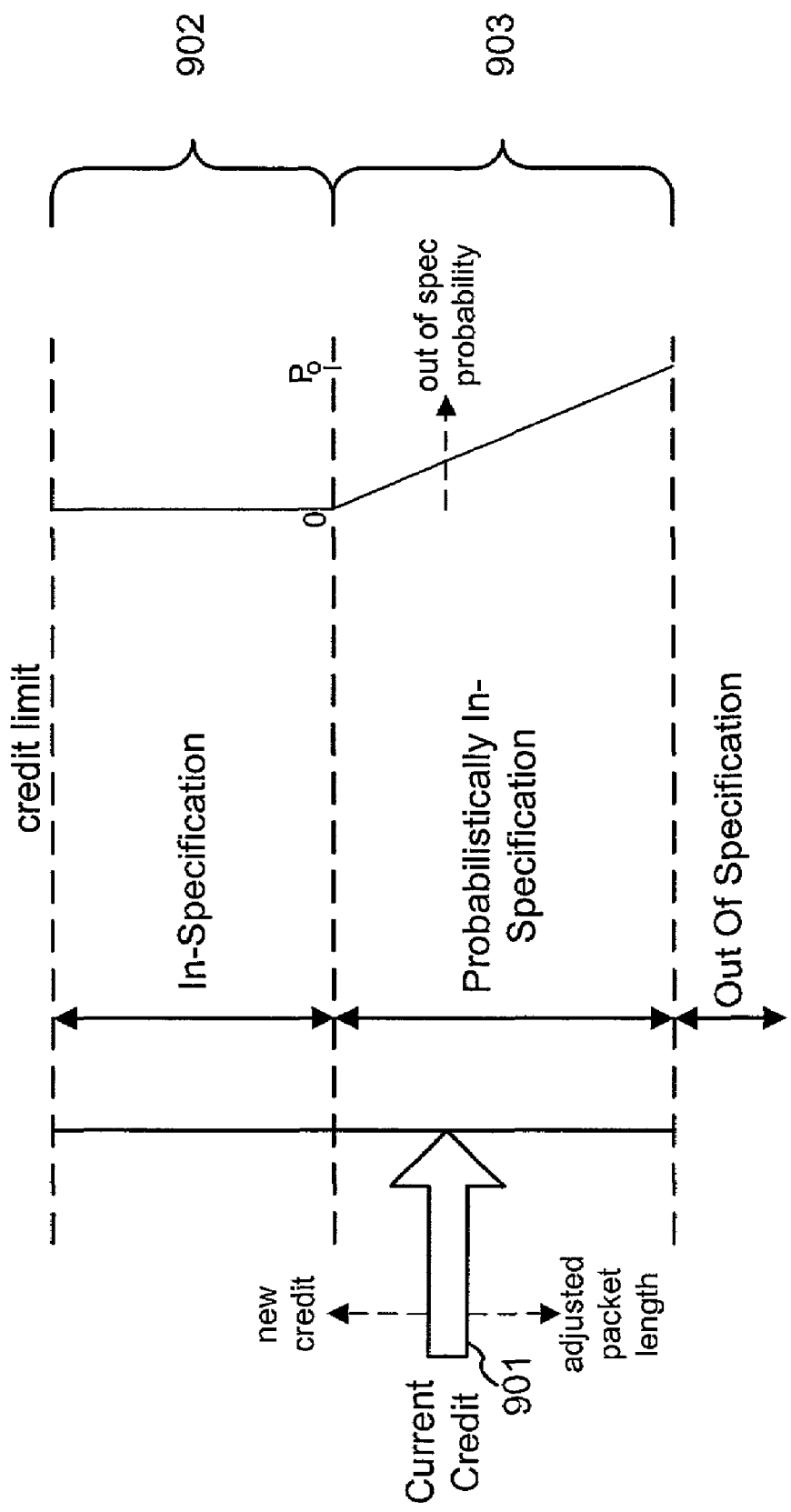
FIG. 9 is a diagram that conceptually illustrates the operation of a data flow policer in determining whether a packet is within specification.

FIG. 9 is a diagram that conceptually illustrates the operation of policer 602 in determining whether a packet is in or out of specification for a data flow. The current credit count for the particular data flow is illustrated by arrow 901. Each time policer 602 processes a packet for the flow, it increments the current credit count based on the elapsed time from the last packet processed for the flow. The current credit count may be incremented up to a maximum count value (i.e., the credit limit). Each time policer 602 processes a packet for the flow, it also decrements the current credit count based on the packet length. When the newly adjusted credit count is within region 902, the packet is within specification. When the newly adjusted credit count is within region 903, the packet is probabilistically within specification. In region 903, policer 602 decides whether the packet is within specification or out of specification based on a probability function. One such probability function is illustrated in the right hand portion of FIG. 9. As shown, the probability of a packet in region 903 being considered out of specification linearly increases from zero at the top of region 903 to a maximum value $P_0$ at the bottom of region 903, where $P_0$ is a programmable value (e.g., 0.8). Below region 903, the probability of the packet being considered out of specification is 100 percent.

Figure 10:
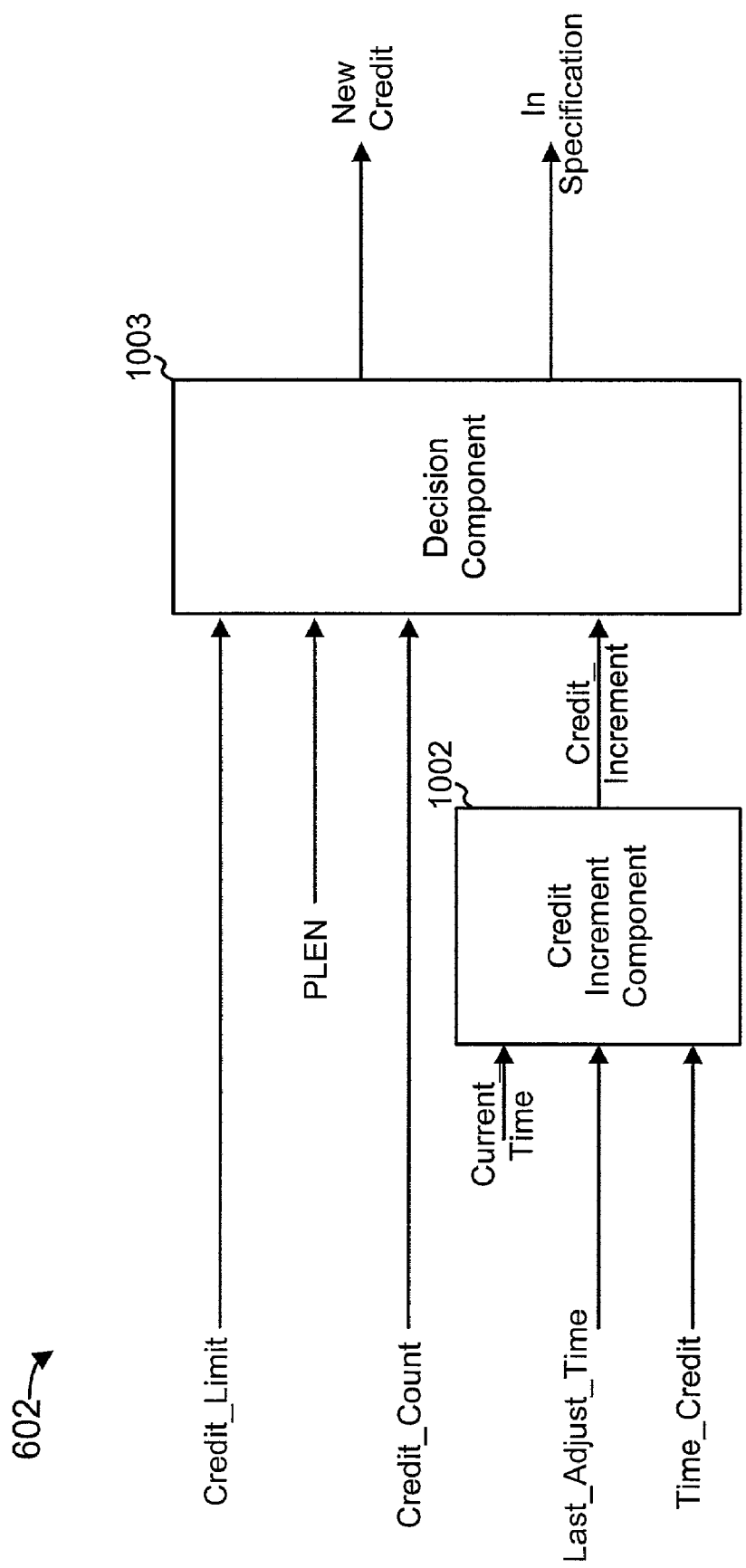
FIG. 10 is a diagram illustrating an exemplary hardware implementation of a policing engine.

FIG. 10 is a diagram illustrating a portion of policer 602 that determines whether a packet is within specification. In general, policer 602 includes two main processing components, credit increment component 1002, and decision component 1003. To maximize processing speed, these components may be implemented in hardware (e.g., as one or more application specific integrated circuits). To further increase throughput, policer 602 may include multiple parallel credit increment components 1002 and decision components 1003.

In general, policer 602 includes two main processing components, credit increment component 1002, and decision component 1003. Credit increment component 1002 and decision component 1003 receive a number of parameters. More particularly, credit increment component 1002 receives time_credit field 703, last_adjust_time field 807, and an indication of the current time (current_time). Time_credit and last_time are stored in the data structure corresponding to the data flow. Current_time is an indication of a current time value kept by policer 602. Last_adjust_time indicates the previous time that the credit counter was increased. Based on these three values, credit increment component 1002 calculates "credit_increment," which indicates how much the current credit count should be incremented. More specifically, credit increment component 1002 generates credit_increment based on the difference between current_time and last_adjust_time multiplied by time_credit, which represents the amount of credit the counter receives per time increment. Stated more formally, credit_increment=(current_time−last_adjust_time)× time_credit.

Decision component 1003 receives credit_increment from credit increment component 1002. Additionally, decision component 1003 receives an indication of the packet length (PLEN), the credit limit for the flow, and the credit count (credit_count field 702) that was generated for the previous packet processed for the flow. The packet length is received from the requesting route lookup engine 601. Credit_limit and credit_count are included in the data structure corresponding to the flow.

Decision component 1003 generates a new credit value based on the packet length, credit_count, and credit_increment. For example, the new credit value may be generally calculated as the credit_count plus credit_increment minus the packet length (or minus a value derived from the packet length). However, the maximum allowable value for the new credit value is capped at the credit limit. Additionally, if decision component 1003 determines that the packet is out of specification and is to be dropped, the new credit value is not decremented based on the packet length.

Decision component 1003 may generate the indication of whether or not a packet is within specification using the probabilistic function discussed above. That is, when the value of new credit is within region 902 (FIG. 9), the packet is within specification. If new credit value is in region 903, however, decision component 1003 may generate a random number and compare it to the value of the probability function at the present credit count to determine whether the packet is within specification. Below region 903, decision component 1003 indicates that the packet is out of specification.

After policer engine 601 generates the new credit value and the indication of whether the packet is within specification, policer 602 returns the indication of within specification or out of specification to route lookup engine 601 and updates the data structure.

SUMMARY

As described above, a rate policer enforces data flow policies for a number of data flows using a probabilistic policy enforcement mechanism. The probabilistic enforcement mechanism helps avoids the choppy and non-uniform bandwidth pattern associated with conventional hard-drop credit based rate policers. Because state information of each data flow operated on by the rate policer is stored as a relatively small data structure in memory, the number of flows operated on by the rate policer can be expanded simply by generating an additional data structure. Additionally, the core computation sections of the rate policer may be implemented in hardware, thus increasing the performance of the rate policer.

The foregoing description of preferred embodiments of the invention provides illustration and description, but is not intended to be exhaustive or to limit the invention to the precise form disclosed. Modifications and variations are possible in light of the above teachings or may be acquired from practice of the invention. Moreover, while a series of acts has been presented with respect to FIG. 8, the order of the acts may be different in other implementations consistent with principles of the invention.

Also, PFEs 310 may be implemented in hardware, software, or some combination thereof. For example, various portions of PFEs 310 may be implemented as application-specific integrated circuits (ASICs). The ASICs may be configured to perform some processing via dedicated logic, and may also be configured to perform some processing using microcode instructions that may be stored in memory. Those skilled in the router art will appreciate that the invention described herein might be practiced using a variety of hardware configurations in addition to, or instead of, ASICs. For example, some combination of general purpose processors, digital signal processors (DSPs), and programmable gate arrays (PGAs) may also be used to implement the functionality described herein.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A data flow policing device comprising:
   a policer configured to receive a policing request that includes an indication of a packet belonging to a data flow and to determine whether the packet is within specification using a function that implements a probabilistic function based on a credit count associated with the data flow, the policer determining whether the packet is within specification by comparing a probability value derived from the credit count to a random number; and
   a memory configured to store a data structure corresponding to the data flow, the data structure including at least the credit count of the data flow.

2. The data flow policing device of claim 1, further comprising:
   a route lookup engine configured to transmit the policing request to the policer and configured to drop the packet when the policer determines that the packet is not within specification.

3. A data flow policing device comprising:
   a policer configured to receive a policing request that includes an indication of a packet belonging to a data flow and to determine whether the packet is within specification using a function that implements a probabilistic function based on a credit count associated with the data flow, the policer further comprising
      a credit increment component configured to calculate an amount to increment the credit count, and
      a decision component configured to receive the amount to increment the credit count and generate the determination of whether the packet is within specification using the probabilistic function based on the credit count and as modified by a length of the packet and the amount to increment the credit count; and
   a memory configured to store a data structure corresponding to the data flow, the data structure including at least the credit count associated with the data flow.

4. The data flow policing device of claim 3, wherein the credit increment component and the decision component are implemented as application specific integrated circuits.

5. The data flow policing device of claim 1, wherein the memory is configured to store a plurality of data structures corresponding to a plurality of data flows.

6. The data flow policing device of claim 1, wherein the data structure in the memory further includes:
   a field that stores an indication of a last time that the data structure was modified, and
   an indication of a maximum credit value for the credit count.

7. A data flow policing device comprising:
   a memory configured to store data structures corresponding to a plurality of data flows, the data structures including at least a credit count associated with the data flows; and
   a policer configured to:
      receive a policing request that includes an indication of a packet belonging to at least one of the data flows,
      read the data structure corresponding to the data flow from the memory, in response to the request,
      determine whether the packet is within specification based on evaluation of a probabilistic function in which the credit count associated with the data flow is input as a parameter to the probabilistic function, and
      update the read data structure in the memory.

8. The data flow policing device of claim 7, wherein the evaluation of the probabilistic function includes comparing a probability value derived from the credit count to a random number.

9. The data flow policing device of claim 7, further comprising:
a route lookup engine configured to transmit the policing request to the policer and drop the packet when the policer determines that the packet is not within specification.

10. The data flow policing device of claim 7, wherein the policer further comprises:
a credit increment component configured to calculate an amount to increment the credit count, and
a decision component configured to receive the amount to increment the credit count and generate the determination of whether the packet is within specification using the probabilistic function in which the credit count is modified by the length of the packet and the amount to increment the credit count before being input to the probabilistic function.

11. The data flow policing device of claim 10, wherein the credit increment component and the decision component are implemented as application specific integrated circuits.

12. A method comprising:
receiving a request to perform a credit based flow control operation, the request identifying at least a length of a data packet and a flow to which the data packet belongs;
reading a data structure corresponding to the identified flow from a memory, the data structure including at least a credit count associated with the data flow;
generating a random number;
determining whether the data packet is within specification by comparing a probability value derived from the credit count to the random number; and
writing an updated version of the data structure to the memory.

13. The method of claim 12, further comprising:
transmitting the determination of whether the data packet is within specification to a device from which the request was received.

14. The method of claim 12, wherein the data structure additionally includes:
an indication of the last time that the credit count was modified.

15. The method of claim 12, wherein the data structure additionally includes:
an indication of a maximum credit value for the credit count.

16. The method of claim 12, wherein the data structure additionally includes:
a field configured to store a count of the number of packets that are not within specification.

17. A network device comprising:
a physical interface configured to receive packets from and transmit packets to a network; and
a processing unit configured to store the received packets and determine a destination device for the packets, the processing unit including a route lookup unit that comprises:
a plurality of route lookup engines,
a policer configured to receive a policing request for a packet associated with a data flow from one of the plurality of route lookup engines and determine whether the packet is within specification based on information contained in a data structure associated with the data flow, the data structure including at least a credit count of the data flow, the policer determining whether the packet is within specification using a probabilistic function based on the credit count, the policer including
a credit increment component configured to calculate an amount to increment the credit count, and
a decision component configured to receive the amount to increment the credit count and generate the determination of whether the packet is within specification using the probabilistic function based on the credit count that is modified based on a length of the packet and the amount to increment the credit count; and
a memory configured to store the data structure corresponding to the data flow.

18. A network device comprising:
a physical interface configured to receive packets from and transmit packets to a network; and
a processing unit configured to store the received packets and determine a destination device for the packets, the processing unit including a route lookup unit that comprises:
a plurality of route lookup engines,
a policer configured to receive a policing request for a packet associated with a data flow from one of the plurality of route lookup engines and determine whether the packet is within specification based on information contained in a data structure associated with the data flow, the data structure including at least a credit count of the data flow, the policer determining whether the packet is within specification using a probabilistic function based on the credit count by comparing a probability value derived from the credit count to a random number, and
a memory configured to store the data structure associated with the data flow.

19. The network device of claim 17, wherein the one of the plurality of route lookup engines drops the packet when the policer determines that the packet is not within specification.

20. The network device of claim 17, wherein the credit increment component and the decision component are implemented as application specific integrated circuits.

21. The network device of claim 17, wherein the memory is configured to store a plurality of data structures corresponding to a plurality of data flows.

* * * * *